Jan. 28, 1930.  W. FUHR  1,744,959
TURNING DEVICE FOR AUTOMOBILES
Filed Sept. 22, 1927  3 Sheets-Sheet 1
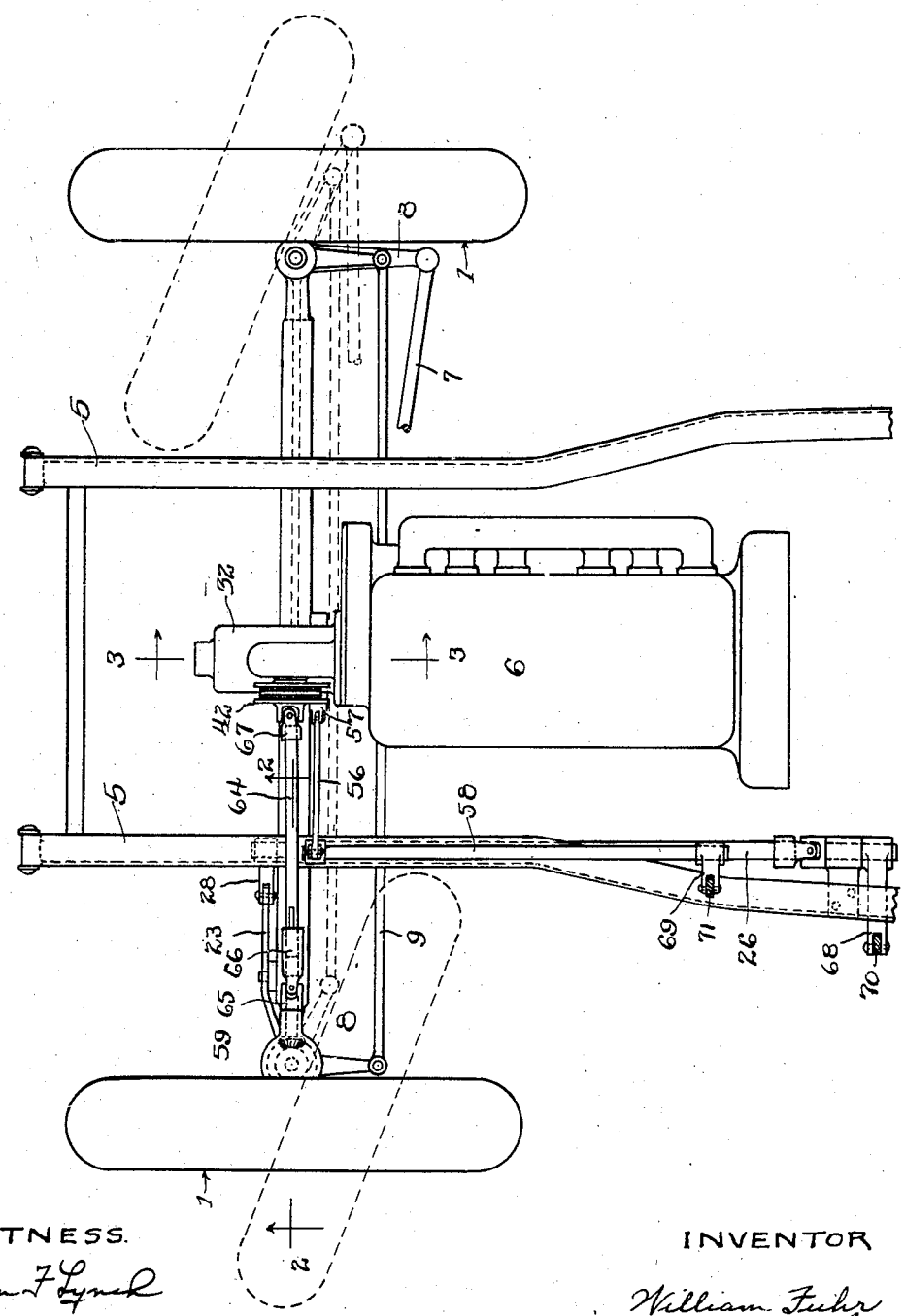

Jan. 28, 1930.  W. FUHR  1,744,959
TURNING DEVICE FOR AUTOMOBILES
Filed Sept. 22, 1927  3 Sheets-Sheet 2
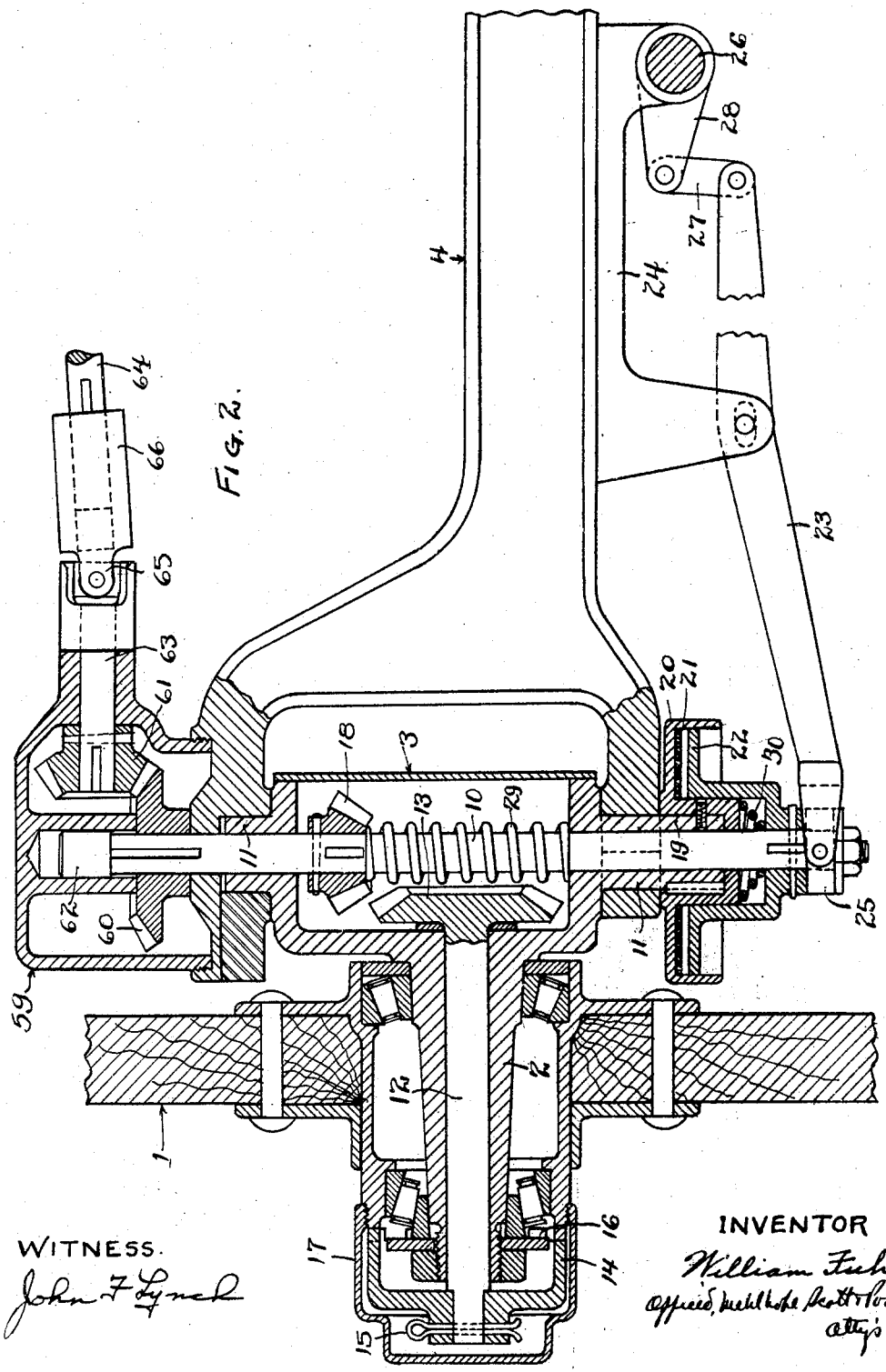

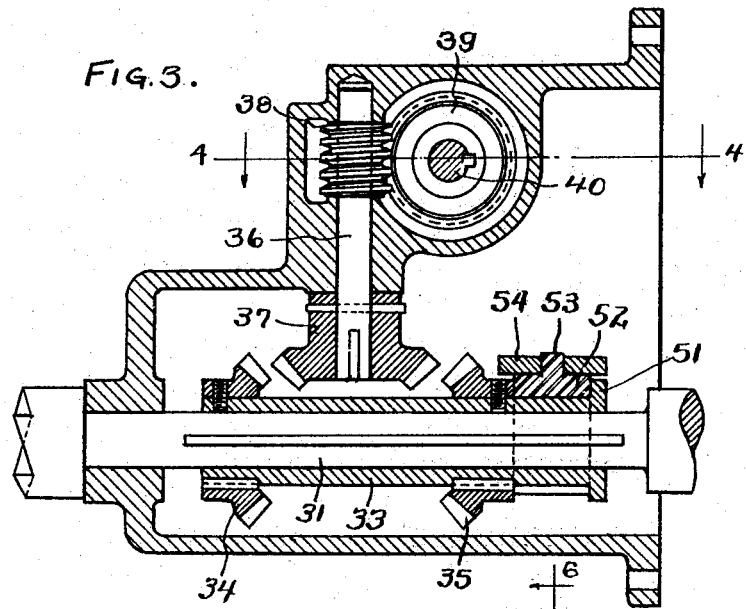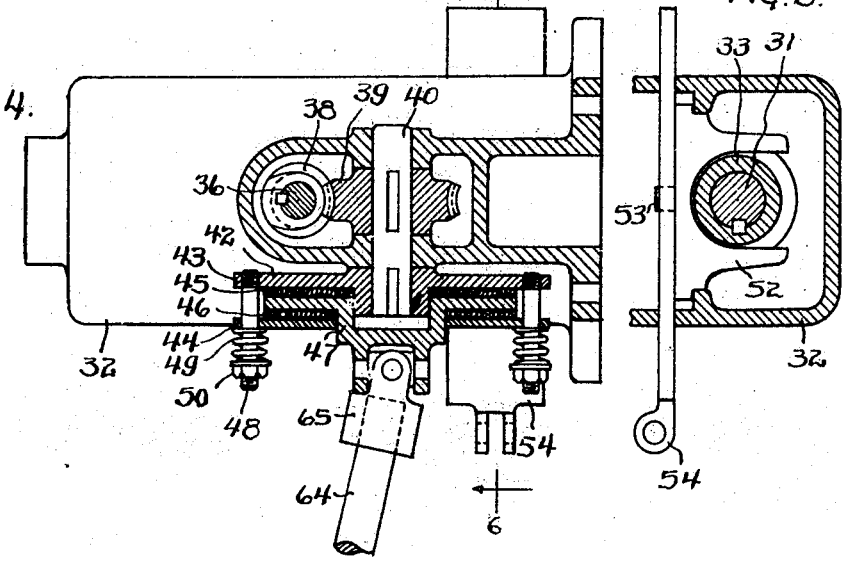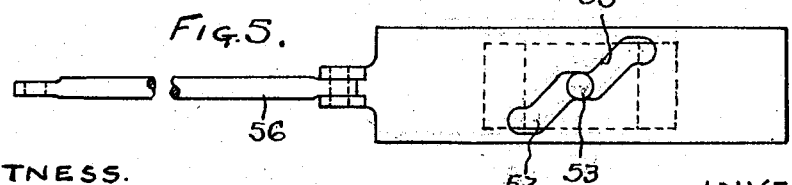

Patented Jan. 28, 1930

1,744,959

UNITED STATES PATENT OFFICE

WILLIAM FUHR, OF CHICAGO, ILLINOIS

TURNING DEVICE FOR AUTOMOBILES

Application filed September 22, 1927. Serial No. 221,159.

This invention relates to improvements in turning devices for automobiles and more particularly to a mechanism associated with the front or steering wheel which will enable the driver to swing the front wheels while the vehicle is stationary and drive out at a sharp angle to its starting position.

The object of this invention is to provide a device which will enable a vehicle to be turned around in narrow or congested streets, driven in and out of cramped quarters, and turned out of ruts in muddy or snow-covered roads without interfering with the normal operation of the vehicle.

It is understood that steering a vehicle in motion is a simple matter, but that steering the vehicle when starting from a stationary position is difficult, due to the fact that the leverage of the steering arm decreases as the angle of turn increases. Likewise, steering at a sharp angle is of no avail unless one of the wheels is power driven, as the power applied through the rear wheels merely carries the vehicle forward with the front wheels sliding over the ground.

The novel features of this invention reside in the mechanism for swinging the front wheels and for applying the power of the motor to one or both of them.

A preferred embodiment of the invention is disclosed in the accompanying drawings, in which Figure 1 is a general top plan view of the forward part of an automobile chassis with the turning device applied.

Figure 2 is an enlarged detail view of the wheel swinging and rotating mechanism in vertical longitudinal section as taken on line 2—2 of Figure 1.

Figure 3 is a detail view of the power transmission unit of the device in vertical longitudinal section as taken on line 3—3 of Figure 1.

Figure 4 is a view in cross section as taken on line 4—4 of Figure 3.

Figure 5 is a plan view of the shifting plate, and

Figure 6 is a detail view of the shifting yoke as taken on line 6—6 of Figure 4.

As shown in Figure 1, the turning device is located at the forward end of the automobile chassis and associated with the front wheels 1, 1. As is common in automobile design, the front wheels are journalled on spindles 2, 2 formed integral with steering knuckles 3, 3 pivoted to turn on vertical axis in the forked ends of the front or dead axle 4, although the design and mounting of the steering knuckles in the present instance differs somewhat from the standard practice. The front axle 4 is fixed to the chassis consisting primarily of two side frame members 5, 5 spaced closer together than usual at the front end to give increased turning radius for the wheels 1, 1. A motor 6 is mounted on the chassis in the ordinary manner.

The chassis is equipped with a steering gear consisting of the usual steering wheel and column (not shown), operatively connected with a drag link 7, in this case extending transversely of the chassis behind the front axle and connected with a rearwardly projecting lever arm 8 integral with the right-hand steering knuckle, said arm being connected with a corresponding arm 8 at the left-hand knuckle by a cross link 9.

Referring now to the turning device proper, the same is applied to only one of the front wheels—the left preferably since it is ordinarily on the outside in making sharp turns from a standing position. A drive shaft 10 is rotatably and slidably mounted within bearings 11, 11 at the upper and lower end of the steering knuckle 3 with both ends extending through and beyond the bearings. As shown in Figure 2, the knuckle has the form of a hollow cylindric casing and the spindle is tubular and opens into the knuckle at right angles. Journalled in the tubular spindle is a stud shaft 12 having a pinion 13 at its inner end located just within the knuckle. At the outer end of the stud shaft 12 is mounted a cup-shaped driving member 14, held in place by a cotter pin 15 and connected to the hub of the wheel 1 by means of interlocking teeth and notches as at 16. The end of the wheel hub carries a hub cap 17. A bevel pinion 18 is rigidly mounted on the shaft 10 within the knuckle and adapted to mesh with the bevel gear 13 and rotate it, this driving the vehicle wheel when the shaft 10 is in rotation.

The lower knuckle bearing 11 is provided with an extension 19 extending below the lower fork member of the axle, as shown in Figure 2, and on which is mounted a clutch consisting of a cup-shaped disc 20 rigidly mounted on said extension 19 and within which is mounted a friction disc 21 of a suitable material. A disc 22 is rigidly mounted on the lower end of the drive shaft 10 and is adapted to slide in and out of contact with the said friction disc 21 and exerting sufficient frictional power on the steering knuckle to swing the wheel, the amount of power being governed by the pressure applied by the driver through the following clutch operating mechanism:

A lever 23 is mounted on the axle 4 by means of a bracket 24, and connected at one end to the drive shaft 10 by a swivel joint 25, and to an operating rod 26 by a link 27 and rock arm 28, whereby the said drive shaft 10 is shifted endwise and into or out of engagement with either the wheel swinging friction clutch or wheel rotating beveled gear 13. The spring 29, mounted on the shaft 10 just below the beveled gear 13, and a spring 30 between the clutch members 20 and 22 act automatically to shift the shaft 10 into neutral position when the operating rod 26 is released.

Rigidly mounted to the front of the motor and surrounding the front end of the motor crank shaft 31 is a transmission housing 32. Slidably mounted on the crank shaft 31 in a sleeve 33 carrying two miter gears 34 and 35, as shown in Figure 3. A shaft 36, perpendicular to the crank shaft 31, is journalled within the said housing 32, and at its lower end is rigidly mounted a miter gear 37, located between said miter gears 34 and 35 and adapted to mesh with one or the other as the sleeve 33 is shifted. The other end of the said shaft 36 is provided with a worm 38 which is at all times in mesh with a worm gear 39, rigidly mounted on a shaft 40. One end of the shaft 40 protrudes beyond the housing and is connected with a friction coupling 42 (Figure 4) consisting of end plates 43 and 44, friction discs 45 and 46 of suitable material, and a friction plate 47. The end plates 43 and 44 are jointed by a plurality of studs 48 having springs 49 adjustable by nuts 50 on the studs, so that the friction may be regulated to the power required to propel the vehicle. Thus by shifting either one of the miter gears 34 or 35 into mesh with the miter gear 37, the shaft 36 with its worm 38 is rotated, which in turn rotates the worm gear 39, shaft 40 and friction coupling 42.

The shifting means for engaging one or the other of the miter gears 34 or 35 with the miter gear 37 will now be described: Mounted within the housing 32 is a shifting yoke 52 straddling the sleeve 33 and riding within a groove formed by a shoulder 51 at the adjacent end of the sleeve and miter gear 35. At the base of the yoke 52 is a lug 53. A plate 54 with cam slot 55 is arranged over the said yoke with the lug 53 extending within the said cam slot, as shown in Figure 5. By shifting this plate 54, the lug 53, together with the yoke 52, sleeve 33 and miter gears 34 and 35 will be shifted forward or backward, bringing one or the other of the miter gears 34 or 35 in mesh with the miter gear 37. A link 56 and rock arm 57 connects the said shifting plate 54 with the operating rod 58, as shown in Figure 1.

A gear housing 59 is rigidly mounted on the upper fork of the automobile axle, as shown in Figure 2, within which is located a bevel gear 60 and pinion 61 meshing with each other. The bevel gear 60 is slidably mounted on the upper end of the drive shaft 10, which has an enlarged end 62 to limit the movement of the shaft and thus prevents the pinion 18 from going below the pitch line of the bevel gear 13 when shifted into mesh therewith. The beveled pinion 61 is mounted on a horizontal shaft 63 extending into the gear housing 59, and is connected with a propeller shaft 64 by a universal joint 65 having a sleeve 66 slidably connected with the end of the shaft 64. The propeller shaft 64 is connected at its inner end to the friction plate 47 by a universal joint 67, thereby transmitting power to the drive shaft 10. It will be noted from Figures 2 and 3 that neither the final gear 18 no the initial gear 37 is in engagement when the device is not in use, thus causing no interference with the normal operation of the vehicle. The operating rods 26 and 58, shown in Figure 1, are provided with rock arms 68 and 69 respectively, from which rods and 71 extend to within easy reach of the driver.

The operation of this device is as follows:

This device has but one speed, either forward or backward, with a ratio between the motor and wheel of about 100 to 1. While it can be used for straight driving in emergencies, its real purpose is to turn the vehicle from a stationary position, and only whenever sharp turns are necessary.

Of the two operating rods 26 and 58, the latter controls the power from the motor either forward or reverse, and the former operates the shaft 10 for either turning or driving the wheel. The first operation is to swing the front wheels either to the right, or left, whichever the direction of the turn. If to the left, the rod 58 is swung to the left which throws the miter gear 35 in mesh with the miter gear 37. Then the rod 26 is swung to the left with sufficient pressure to permit easy turning of the steering wheel. When the front wheels have reached the desired angle the rod 26 is swung to the right as far as it will go, which releases the friction clutch and throws the driving pinion into mesh with the bevel gear 13 and rotating the wheel forward. If it is desired to rotate the wheel backward while the front wheels are in this position the rod 58 is swung to the right before the rod 26 is swung to the right. If it is desired to turn to the right instead of to the left, the operation is reversed and both rods 26 and 58 are swung to the right.

By means of this device the vehicle can be moved from a stationary position within a relatively small radius, thus enabling the driver to extricate the vehicle from close or cramped spaces. The vehicle is constructed so that the front wheels can be swung through a steering radius of about 90° and hence, when the power is applied to the front wheel the vehicle will move practically at right angles to the direction it is facing. During the operation of the turning device it is understood that the steering gear is released, so that the steering and driving is wholly accomplished by power supplied by the motor and controlled by the driver.

Having set forth the novel features of my invention, I claim:

1. In a turning device for automobiles, the combination of a front axle, a spindle pivotally mounted at the end of said axle, a wheel journalled on said spindle, a driven shaft extending axially of said spindle and connected with said wheel, a driving shaft extending at right angles to said driven shaft and in axial alignment with the turning axis of said spindle, a propeller shaft driven by the motor of said automobile and operatively connected with said drive shaft, gear members mounted on said driving and driven shafts and adapted to be shifted into and out of mesh, a clutch interposed between said driving gear and said spindle, and means for shifting said gear members into mesh and simultaneously releasing said clutch and vice versa.

2. In a turning device for automobiles, the combination of a front axle, a spindle pivotally mounted at the end of said axle, a wheel journalled on said spindle, a driven shaft extending axially of said spindle and connected with said wheel, a driving shaft extending at right angles to said driven shaft in axial alignment with the turning axis of said spindle and adapted to be shifted endwise, a propeller shaft driven by the motor of said automobile and operatively connected with said drive shaft, beveled gears mounted on said driving and driven shafts, a clutch interposed between said driving gear and said spindle, means for shifting said driving shaft endwise for releasing and engaging said clutch, and shifting said gears into and out of mesh.

3. In a turning device for automobiles, the combination with a front axle, spindle and front wheel journalled on said spindle, of a driving shaft coinciding with the steering axis of said spindle, clutch members mounted on said driving shaft and spindle, manually operative means for shifting said shaft endwise to connect and disconnect the same with said spindle, a propeller shaft operatively connecting said driving shaft with said motor, a driven shaft adapted for driving connection with said driving shaft and with said wheel including gear members adapted to be thrown into and out of mesh in the endwise shifting of said drive shaft to disengage and engage the same from said spindle.

4. In a turning device for automobiles, the combination with a front axle, spindle and front wheel journalled on said spindle, of a driving shaft coinciding with the steering axis of said spindle, clutch members mounted on said driving shaft and spindle, manually operative means for shifting said shaft endwise to connect and disconnect the same with said spindle, a propeller shaft operatively connecting said driving shaft with the crank shaft of said motor, reversing mechanism interposed between said propeller and crank shafts, a driven shaft journalled in said spindle and connected with said wheel, gear members mounted on said driving and driven shafts and adapted to be thrown into and out of mesh in the endwise shifting of said drive shaft to disengage and engage the same from said spindle.

5. In a turning device for automobiles, the combination with a front axle, spindle and front wheel journalled on said spindle, of a driving shaft coinciding with the steering axis of said spindle, clutch members mounted on said driving shaft and spindle, manually operative means for shifting said shaft endwise to connect and disconnect the same with said spindle, a propeller shaft operatively connecting said driving shaft with the crank shaft of said motor, a friction coupling interposed between said motor and said propeller shaft, a driven shaft journalled in said spindle and connected with said wheel gear members mounted on said driving and driven shafts and adapted to be thrown into and out of mesh in the endwise shifting of said drive shaft to disengage and engage the same from said spindle.

Signed at Chicago, Ill., this 9th day of September, 1927.

WILLIAM FUHR.